United States Patent [19]

Wieske et al.

[11] Patent Number: 5,079,028

[45] Date of Patent: Jan. 7, 1992

[54] EMULSIFYING COMPOSITIONS CONTAINING A MIXTURE OF HYDROLYZED AND UNHYDROLYZED FRACTIONS AND PROCESS FOR MAKING SAME

[75] Inventors: Theophil Wieske; Klaus H. Todt, both of Hamburg, Fed. Rep. of Germany; Jan A. De Feÿter, Nieuwerkerk a/d Ijssel; Wilhelmus A. Castenmiller, Vlaardingen, both of Netherlands

[73] Assignee: Van den Bergh Foods Co., division of Conopco, Inc., Lisle, Ill.

[21] Appl. No.: 428,483

[22] Filed: Oct. 30, 1989

Related U.S. Application Data

[63] Continuation of Ser. No. 68,689, Jun. 30, 1987, abandoned.

[30] Foreign Application Priority Data

Jul. 1, 1986 [GB] United Kingdom ................ 8616041

[51] Int. Cl.$^5$ ............................ A23D 7/00; A23J 7/00
[52] U.S. Cl. ................................... 426/662; 426/425; 426/429; 426/603; 426/604; 426/609; 426/611; 426/654
[58] Field of Search .............. 426/603, 604, 609, 611, 426/654, 662, 425, 429

[56] References Cited

U.S. PATENT DOCUMENTS

3,505,074 4/1970 Pardun ................................ 260/403
3,652,397 3/1972 Pardun ................................ 426/603

FOREIGN PATENT DOCUMENTS

0141442 5/1985 European Pat. Off. ............ 426/603
1113241 5/1968 United Kingdom .
1215868 12/1970 United Kingdom .
1355967 6/1974 United Kingdom .

OTHER PUBLICATIONS

Derwent Abstract for FR 2,106,372 Jun. 1974.

*Primary Examiner*—Donald E. Czaja
*Assistant Examiner*—Evan Federman
*Attorney, Agent, or Firm*—Rimma Mitelman

[57] ABSTRACT

A surface-active composition is provided which comprises phosphatidylcholine and phosphatidylethanolamine, wherein at least 3 wt. % of the phosphatide is lysophosphatidylethanolamine and wherein the hydrolysis ratio of the degree of hydrolysis of phosphatidylethanolamine and the degree of hydrolysis of phosphatidylcholine is higher than 1.7. The composition is particularly suitable for use as emulsifying agent in edible fat-containing products, especially as anti-spattering agent in, for example, margarine. The surface-active composition can be suitably prepared by fractionating vegetable lecithin with, for example, a lower alcohol, partially hydrolyzing the insoluble fraction and recombining the partially hydrolyzed insoluble fraction with the alcohol-soluble fraction.

19 Claims, No Drawings

EMULSIFYING COMPOSITIONS CONTAINING A MIXTURE OF HYDROLYZED AND UNHYDROLYZED FRACTIONS AND PROCESS FOR MAKING SAME

This is a continuation application of Ser. No. 068,689, filed June 30, 1987, now abandoned.

FIELD OF THE INVENTION

The present invention relates to a surface-active composition comprising phosphatides, to a process for preparing such composition and to an edible-fat-containing composition including such surface-active composition.

BACKGROUND OF THE INVENTION

Mixtures comprising phosphatides are obtained as by-products in the refining of edible oils and are used, for instance, in foodstuffs, in pharmaceutical products and in cosmetic preparations, especially for their emulsifying properties.

The dry matter of such crude phosphatide mixtures (often referred to as crude or commercial lecithin) as obtained from the refining of, for instance, soyabean or rapeseed oil commonly comprises about 50-65% by weight of phosphatides, 30-40% of neutral glycerides, free fatty acids, sterol compounds, tocopherols etc. and 5-10% of sugars. The phosphatides usually consist mainly of phosphatidylcholine (henceforth called PC), phosphatidylethanolamine (PE), phosphatidylinositol (PI) and phosphatidic acid (PA). Dry, crude vegetable lecithin commonly comprises from about 5 to about 20% by weight of each of these components. Phosphatides that may occur in small amounts in crude lecithin are for example phosphatidylserine, acetylphosphatidylethanolamine and phosphatidylglycerol.

Commonly, by far the major part of the phosphatides in commercial lecithin occurs in the diacyl form. However, small amounts of hydrolysed phosphatides may be present in the lecithin. For example, 1 or 2% of the PC contained in commercial lecithin may occur in the lyso form, i.e. as mono-acylphosphatidylcholine. Henceforth, the lyso and diacyl forms of PC are indicated as LPC and DPC, respectively. Corresponding abbreviations are used to indicate the other phosphatides.

Surface-active compositions comprising phosphatides can suitably be incorporated as emulsifier in edible fat containing products such as for example margarines or low fat spreads. The presence of phosphatides may reduce the spattering that occurs when a fat product, for example margarine, frying oil or a shortening, is used for frying.

DESCRIPTION OF THE RELATED ART

According GB 1,113,241 the performance of lecithin as anti-spattering agent can be improved by increasing the PC-content relative to the PE-content. This is achieved by extraction with aqueous alkanol.

According to U.S. Pat. No. 3,505,074 the emulsifying properties of phosphatides, for example as anti-spattering agent in margarine, can be improved by partial hydrolysis of the phosphatides.

GB 1,355,967 teaches to improve the spattering characteristics of pourable margarines by including phosphatides, 5-35 wt. % of which are lysophosphatides. Phosphatide-mixtures having the desired lysophosphatide content are obtained by hydrolysing crude lecithin.

GB 1,215,868 aims at providing margarines, to be prepared via a phase inversion process, that have butterlike elasticity and plasticity. To achieve this, it is proposed to include phosphatides, part of which have been hydrolysed to lysophosphatides. Preferably, a phosphatide composition is used with a relatively high LPC content, which compositions are prepared by extracting crude lecithin with alcohol and subsequently partially hydrolysing the alcohol-soluble fraction.

SUMMARY OF THE INVENTION

It has now been found that it can be beneficial, in particular to improve the frying properties of edible fat containing products e.g. margarine or frying fat, to include a phosphatide composition, part of which has been hydrolysed, in which composition the weight ratio of LPC and LPE is relatively low compared with the weight ratio of DPC and DPE.

According to a first aspect, the present invention provides a surface-active composition comprising phosphatides, which phosphatides comprise PC and PE, wherein the composition comprises at least 3% LPE, calculated on the weight of the phosphatides, and wherein the hydrolysis-ratio of the degree of hydrolysis of PE and the degree of hydrolysis of PC is higher than 1.5.

The degree of hydrolysis of PC indicates the weight ratio of the LPC and PC contents in the composition (wherein PC comprises both LPC and DPC). Correspondingly, the degree of hydrolysis of PE indicates the weight ratio of the LPE and PE contents. Thus the hydrolysis ratio of a composition can be increased by increasing the DPC and/or the LPE contents, whereas an increase of the DPE and/or LPC contents causes a decrease of the hydrolysis ratio.

The surface-active composition is in particular suitable to be included in edible fat-containing compositions which are meant to be used for shallow frying. Whereas, generally, DPC has a more beneficial effect on the spattering characteristics of such edible fat-containing compositions than has DPE, it has surprisingly been found that the opposite applies to the corresponding lysophosphatides: LPE is more beneficial than LPC. Optimal performance can be obtained with compositions having relatively high contents of DPC and LPE and relatively low contents of DPE and LPC. The influence of other phosphatides, which may be present in the surface-active composition, e.g. PA and PI, in both the diacyl and in the lyso form, is usually intermediate between DPC and LPE on the one hand and DPE and LPC on the other hand.

Compositions consisting predominantly or entirely of phosphatides commonly have very inconvenient rheological properties. They commonly occur in the form of a plastic mass or of a highly viscous fluid which are hygroscopic and often are difficult to handle. To improve their handling properties, it is common practice to include non-phosphatide ingredients.

For example, fluid phosphatide-containing surface-active compositions with relatively low viscosity commonly comprise a substantial amount of glyceride oil, or of another diluent, as carrier. An oil content in such compositions as high as 50 wt. % or even higher is not uncommon. Viscosity-reducing agents, e.g. free fatty acids, partial glycerides, alcohols, or metal ions are often included in such fluid compositions. Alternatively, the ease of handling surface-active compositions consisting essentially of phosphatides is often improved by preparing the composition in the form of a free-flowing powder. This can for example be done via spray-drying. In the preparation of free-flowing powders, carrier material such as calcium phosphate, starch or protein, e.g. milk powder, is commonly included. In addition to non-phosphatide ingredients deliberately included to improve the handling properties of phosphatide compositions, such compositions commonly contain ingredients, e.g. sugars, sterols and glucosides, which originate from the source from which the phosphatides are isolated, e.g. soyabeans. For most applications, the presence of such ingredients does not have a substantial adverse effect on the performance of the phosphatide composition and, therefore, normally no special measures are taken to remove such ingredients. Such ingredients can be present in amounts of e.g. 10–20 wt. %.

The present surface-active composition may also include such non-phosphatide ingredients originating from the phosphatide source, or deliberately added to facilitate the handling of the composition. Suitably, however, the phosphatide content of the composition is at least 20 wt. %, and it may be as high as 95%. Preferably, the phosphatide content of the composition is 40–90 wt. %.

According to a second aspect, the present invention provides an edible fat-containing composition comprising 0.01–2 wt. % phosphatides including PC and PE, which phosphatides comprise at least 3 wt. % LPE, wherein the hydrolysis-ratio of the degree of hydrolysis of PE and the degree of hydrolysis of PC is higher than 1.5.

Such edible fat-containing compositions, e.g. frying fat or oil, margarine and shortenings, are especially suitable for frying purposes, in particular shallow frying. They can have improved spattering characteristics. Such edible fat-containing compositions can also have improved flavour release properties. The phosphatides can suitably be provided by including in the edible fat-containing composition a surface-active composition according to the present invention in an amount appropriate to provide the required amount of phosphatides. Preferably, the edible fat-containing composition comprises 0.05–1.5 wt. % phosphatides.

The hydrolysis-ratio of the degree of hydrolysis of PE and the degree of hydrolysis of PC in the edible fat-containing composition and in the surface-active composition of the present invention should be at least 1.5. There is no upper limit for the hydrolysis-ratio, but in practice it will usually be less than about 50. Henceforth the hydrolysis-ratio is indicated as H*.

As described above, H* indicates the following ratio:

$$H^* = \frac{\frac{[LPE]}{[PE]}}{\frac{[LPC]}{[PC]}},$$

i.e. $H^* = ([LPE] \cdot [PC])/([PE] \cdot [LPC])$, wherein [LPE] indicates the content of LPE calculated on weight and wherein the other symbols indicate the corresponding quantities.

The content of phosphatides from which both fatty acids have been hydrolysed, in the present composition is preferably low, e.g. less than about 5 wt. % of the phosphatides, less than 1 wt. % being particularly preferred. If such doubly hydrolysed phosphatides are essentially absent, then

[PC] = [LPC] + [DPC] and

[PE] = [L E] + [D E].

DESCRIPTION OF SOME PREFERRED EMBODIMENTS

Accordingly, for the preferred compositions of the present invention containing essentially no PC or PE from which both fatty acid residues have been hydrolysed, the hydrolysis-ratio is essentially determined by $$H^* = \frac{[LPE]}{[LPC]} \cdot \frac{[LPC] + [DPC]}{[LPE] + [DPE]}$$

Preferably, the hydrolysis-ratio is higher than 1.6 more preferably higher than 1.7; even more preferably the H*-value is 2–40.

The total amount of DPC and LPE, i.e. the sum of the DPC and LPE contents, calculated on the weight of the phosphatides, preferably is at least 40%; more preferably it is 50–80%. The total amount of LPC and DPE is preferably not higher than 30 wt. % of the phosphatides; more preferably it is 2–20%.

The DPC content, calculated on the weight of the phosphatides, is preferably at least 20%; more preferably it is 30–60%. Similarly, the LPE content is preferably at least 5%, more preferably 7–35%. The DPE content is preferably less than 20%, more preferably 5–15%, and the LPC content is preferably less than 20%; more preferably it is 0–15%.

In the present compositions, substantial contributions to the beneficial effects arise from both the DPC and the LPE. Similarly, relatively poor contributions, compared with the other phosphatides, are given by LPC and DPE. In this respect, DPC and LPE, and similarly DPE and LPC, are to a considerable extent mutually exchangeable. However, the overall degree of hydrolysis of the phosphatides contained in the composition should preferably not be too high, inter alia for taste reasons. Accordingly, the content of lysophosphatides, which is preferably at least 5%, preferably is not higher than 40% by weight of the phosphatides; more preferably it is less than 35% by weight of the phosphatides.

The present surface-active composition can suitably be prepared by mixing an unhydrolysed phosphatide-containing composition that has a relatively high PC content with a partially or completely hydrolysed phosphatide-containing composition with a relatively high PE content. Suitable mixing ratios can easily be determined in dependence of the content of the individual phosphatides in each of the two compositions to be mixed.

According to a preferred process, the present surface-active composition is prepared by fractionating a composition comprising phosphatides to yield a fraction enriched in PC and a fraction enriched in PE, hydrolysing the fraction enriched in PE and combining PC-enriched fraction with hydrolysed PE-enriched fraction. Suitably, the composition comprising phosphatides to be used as starting material in this process is commercial lecithin, e.g. crude lecithin as obtained as by-product in the refining of soyabean oil.

Preferably, the fractionation is carried out by extraction of the phosphatide-containing composition with a suitable solvent. Preferably, the solvent comprises alkanol having 1-3 carbon atoms, e.g. aqueous alcohol. A very suitable solvent, for example, is aqueous ethanol, e.g. the binary azeotropic mixture of ethanol and water.

For example, in commercial soyabean lecithin the [PC]/[PE] ratio commonly is between about 1 and 2. The alcohol-soluble fraction of soyabean lecithin is enriched in PC and has commonly a [PC]/[PE] ratio higher than about 3, e.g. of about 4 or even higher. The alcohol-insoluble fraction has an increased PE content, expressed as % by weight of phosphatides, and its [PC]/[PE] ratio commonly is less than 1, e.g. between about 0.9 and 0.5. The alcohol-insoluble fraction, i.e. the fraction enriched in PE, can then be hydrolysed to a considerable extent to provide a composition with a relatively high LPE content. This composition can then be combined with an adequate amount of unhydrolysed, alcohol-soluble fraction, i.e. a composition with a relatively high DPC content, to provide the surface-active composition.

The hydrolysis of the PE-enriched fraction can suitably be carried out, chemically or enzymatically, in a manner known per se. To obtain a composition that can suitably be included in food products without health risks, it is preferred to carry out the hydrolysis without using non-food ingredients. Preferably, the hydrolysis is carried out enzymatically using phospholipase A2. The hydrolysis is preferably carried out until the degree of hydrolysis of PE, i.e. the [LPE]/[PE] ratio in the composition being hydrolysed, is at least 0.4. More preferably the hydrolysis is continued until the degree of hydrolysis is at least 0.6.

Whether the hydrolysis is carried out chemically or enzymatically, as mentioned in U.S. Pat. No. 3,505,074 cited above, usually there is no substantial difference between the rate of hydrolysis of various phosphatides, and, accordingly, the hydrolysis ratio of compositions that have been hydrolysed is about 1. (The hydrolysis ratio of not deliberately hydrolysed compositions usually is about 1 as well. The rate of inadvertently occurring hydrolysis in the oil seeds and during the oil extraction and refining, which causes to be present up to about 1 or 2% lysophosphatides in e.g. commercial soyabean lecithin, is about the same for the various phosphatides.) In practice, the reaction conditions of the hydrolysis may be chosen such that the rate of hydrolysis of PE is somewhat higher than that of PC. However, the extent to which this is possible is, in practice, limited, and a hydrolysis ratio higher than about 1.3 is not normally obtained for conventionally hydrolysed compositions. To constitute the present surface-active composition having a hydrolysis ratio higher than 1.5, if a conventional hydrolysis procedure is employed, then it is normally necessary to combine a non-hydrolysed composition with a hydrolysed one, wherein the non-hydrolysed composition has a relatively high PC content and/or the hydrolysed one has a relatively high LPE content. Thus, normally a multistep process as indicated above will be suitable to prepare the surface-active composition. However, in principle, any process that yields a product having the desired composition can be used for the preparation of the present surface-active composition.

If the degree of hydrolysis of PE of the hydrolysed composition is about 0.4 or higher, then usually the surface-active composition can suitably be composed by combining hydrolysed and non-hydrolysed composition in a ratio (calculated on the weight of the phosphatides in each of the two compositions) of from about 1:4 to 4:1, preferably of from 1:3 to 3:1. However, suitable mixing ratios can easily be determined in dependence of the content of the individual phosphatides in each of the two compositions.

The edible fat-containing composition suitably comprises 10-100 wt. % fat phase and 0-90 wt. % aqueous phase. Preferably, the edible fat-containing composition comprises 60-100 wt. % continuous fat phase; more preferably it comprises 75-90 wt. % continuous fat phase and 10-25 wt. % dispersed aqueous phase. Another preferred edible fat-containing composition comprises 20-85wt. % continuous aqueous phase and 80-15 wt. % dispersed fat phase.

The edible fat-containing composition is preferably prepared by including an appropriate amount of the present surface-active composition in it. The surface-active composition can thus be incorporated as emulsifier in products such as dressings and mayonnaise. Preferred edible fat-containing compositions are compositions that can be used for frying, in particular for shallow frying, e.g. frying oil or fat, shortening, margarine and the like. If the composition is a dispersion to be prepared via, for example, emulsification of a fat phase and an aqueous phase, then the phosphatides can be incorporated via either phase, but usually it is more convenient to introduce the phosphatides into the composition via the fat phase.

The amount of phosphatides in the edible fat-containing composition preferably is 0.05-0.5%, calculated on the weight of the total composition, for fat-continuous compositions. For water-continuous compositions, e.g. mayonnaise, the preferred phosphatides content is 0.2-1% by weight of the total composition.

The kind of edible fat used is not critical. The edible fat may be solid or liquid at ambient temperature. It may consist essentially of triglycerides such as, for example, soyabean oil, sunflower oil, palm oil, coconut oil, fish oil, butterfat, lard and tallow, which may have been partially or completely hydrogenated or modified otherwise, and mixtures thereof. Alternatively, as edible fat can be used non-toxic material having physical properties similar to triglycerides, which material may be indigestible, such as for example waxes, e.g. jojoba oil and hydrogenated jojoba oil, and poly fatty acid esters of mono- and disaccharides, e.g. sucrose octa fatty acid ester, or mixtures thereof. Similarly, mixtures of such materials with glyceride oils or fats can also be used as edible fat. Preferably, however, the edible fat consists essentially completely of glycerides.

The edible fat-containing composition may include, apart from edible fat, phosphatides and optionally water, other ingredients such as flavours, proteins, gas, preservatives, salt, gelling and thickening agents, e.g. gelatin and starch derivatives, other emulsifiers such as partial glycerides, colouring matter, etc. If the composition is a dispersion, then such ingredients may be present in either or each of the phases. For example, in margarine, both the dispersed aqueous phase and the continuous fat phase may contain aroma compounds, but, alternatively, it may be preferred to include such compounds in the aqueous phase only.

EXAMPLES 1-3

Commercial soybean lecithin was fractionated by means of solvent extraction using aqueous alcohol. The alcohol-insoluble fraction (enriched in PE) was subsequently hydrolyzed under conditions favouring hydrolysis of PA and PE over that of PC and PI, using phospholipase A2 at pH of about 7.5-8 at 60° C. for 4 hours. The composition of the resulting product is shown in table 1. Two other phosphatide compositions were prepared by mixing the hydrolyzed product with an alcohol-soluble fraction of soybean lecithin in weight ratios of 2:1 and 1:2. The compositions of the resulting phosphatide compositions are shown in table I.

With the phosphatide compositions obtained a series of margarines was prepared in a conventional manner using Votator ® equipment. In the margarine composition, phosphatide composition was included in an amount such that a phosphatide content of 0.24 wt. % of the margarine composition was obtained. The following margarine composition was used:

| Fat phase: | |
|---|---|
| Phosphatide composition to provide a phospholipid content of 0.24 wt. % in the margarine | ~0.5-1 wt. % |
| Fish oil hydrogenated to a melting point of 35° C. | 50 wt. % |
| Admul 6203 ® (monoglyceride emulsifier) | 0,05 wt. % |
| Up to 82 wt. % soybean oil | ~31 wt. % |
| Aqueous phase: | |
| Whey solids | 1.0 wt. % |
| NaCl | 0.6 wt. % |
| Citric acid to pH = 4.5 | |
| Up to 18 wt. % tap water | ~16 wt. % |

The spattering behaviour of the margarines was evaluated after storage of the products for 1 week at 5° C., using the following procedure: 25 g margarine was heated in a glass pan on an electric plate that was heated to about 200° C. The fat that was spattered out of the pan by the force of the expanding evaporating water was caught on a sheet of paper situated above the pan.

The image obtained on the paper was compared with a standard set of 11 pictures, numbered 0-10 and the number of the corresponding picture was recorded as the spattering value. 10 indicates no spattering and 0 indicates very bad spattering. In addition to this so-called primary spattering value, which is a measure for the extent of spattering caused by the explosive evaporation of the water contained in the margarine itself, a secondary spattering value is determined, which is indicative for the spattering caused by water subsequently added to the hot fat. When the spattering of the heated margarine stops, the paper sheet is immediately replaced with a clean one and 10 ml cold water is added to the hot fat. The secondary spattering value is determined by comparison of the obtained image with the standard set. The results obtained are shown in table II.

For comparison, the experiment was repeated twice, using as phosphatide composition, unfractionated commercial soybean lecithin and an alcohol-soluble fraction thereof. The phosphatide composition of these products and the results of the spattering tests are shown in tables I and II, respectively.

The results clearly show that the margarines according to the invention had superior spattering characteristics compared with the comparative products.

TABLE I

| Sample | Phosphatide content (wt %) (6) | LPE (7) | LPC (7) | DPE (7) | DPC (7) | LYSO (7) | H* |
|---|---|---|---|---|---|---|---|
| E1 (1) | 27 | 13 | 6 | 8 | 19 | 39 | 2.5 |
| E2 (2) | 26 | 9 | 5 | 5 | 37 | 32 | 4.9 |
| E3 (3) | 25 | 5 | 4 | 3 | 57 | 24 | 8.7 |
| C1 (4) | 24 | — (8) | 3 | <1 | 79 | 14 | 0 |
| C2 (5) | 44 | ~0.2 | ~0.7 | 30 | 30 | 1 | 0.3 |

(1) Selectively hydrolyzed, alcohol-insoluble fraction of soybean lecithin.
(2) Mixture of E1 and alcohol-soluble fraction of soybean lecithin in 2:1 weight ratio.
(3) Mixture of E1 and alcohol-soluble fraction of soybean lecithin in 1:2 weight ratio.
(4) Alcohol-soluble fraction of soybean lecithin.
(5) Unfractionated commercial soybean lecithin.
(6) The remainder of the composition comprises sterolglucosides, sugar, fatty acids and, mainly triglyceride oil.
(7) Expressed as wt. % of the phosphatides. Analysis based on 31P-NMR measurements.
(8) Below detection limit.

TABLE II

| Margarine containing phosph. comp. | Primary Spattering Value | Secondary Spattering Value |
|---|---|---|
| E1 | 8.7 | 6.5 |
| E2 | 8.5 | 5.5 |
| E3 | 8.2 | 7.3 |
| C1 | 7.5 | 5.2 |
| C2 | 7.0 | 4.7 |

EXAMPLE 4

A phosphatide composition was prepared that contained about 18 wt. % DPC, 11 wt. % LPC. 4 wt % DPE, 7 wt. % LPE, 4 wt. % DPI, 1 wt. % LPI, 2 wt. % DPA, 4 wt. % LPA, about 2 wt. % sugars and about 6 wt. % sterolglucosides, the balance consisting essentially of triglyceride oil carrier material. The LPE-content calculated on the total amount of phosphatides was about 13 wt. %. The H*-value was 17.

Margarine was prepared in a manner similar to the one described above. The salt content of the margarine composition was 0.2 wt. %. The composition contained 0.5 wt % milk solids instead of the whey solids. The phosphatide composition described above was included in an amount of 0.3 wt. % of the margarine composition resulting in a total phosphatides content of about 0.15 wt. % of the margarine composition. The margarine obtained had good anti-spattering properties. The secondary spattering value was 7.

For comparison the experiment was repeated but instead of using the phosphatide composition of the present invention, 0.15 wt. % phosphatides was provided by including 0.4 wt. % phosphatide composition that contained about 8 wt. % DPC, 3 wt. % LPC, 6 wt. % DPE, 4 wt. % LPE, 7 wt. % DPI, 1 wt. % LPI, 7 wt. % DPA and 2 wt. % LPA, the balance consisting essentially of carrier material comprising triglyceride oil, fatty acids, sterolglycosides and sugars. The LPE content calculated on the total amount of phosphatides was about 11 wt. %, but the H* value was only 1.4. The spattering properties of this composition were very poor. The secondary spattering value was only 3.

We claim:

1. A surface active composition comprising 20-95% phosphatides, said phosphatides comprising an unhydrolyzed phosphatidylcholine-enriched fraction and a hydrolyzed phosphatidylethanolamine-enriched fraction said unhydrolyzed phosphatidycholine-enriched fraction comprising diacyl-phosphatidylcholine (DPC) and lysophosphatidylcholine (LPC), and said hydrolyzed phosphatidylethanolamine fraction comprising diacyl-phosphatidylethanolamine (DPE) and at least 3% lysophosphatidylethanolamine (LPE), by weight of the phosphatides, wherein the ratio of the degree of hydrolysis of the phosphatidylethanolamine-enriched fraction to the degree of hydrolysis of the phosphatidylethanolamine-enriched fraction expressed as LPE/LPE+DPE:LPC/LPC+DPC is higher than 1.7.

2. Composition according to claim 1, wherein the hydrolysis ratio is 2-40.

3. Composition according to claim 1, wherein the total amount of diacylphosphatidylcholine (DPC) and lysophosphatidylethanolamine (LPE) in the composition is at least 40% by weight of the phosphatides.

4. Composition according to claim 3, wherein the total amount of diacylphosphatidylcholine (DPC) and lysophosphatidylethanolamine (LPE) is 50-80% by weight of the phosphatides.

5. Composition according to claim 1, wherein the total amount of diacylphosphatidylethanolamine (DPC) and lysophosphatidylcholine (LPE) is at most 30% by weight of the phosphatides.

6. Composition according to claim 5, wherein the total amount of diacylphosphatidylethanolamine (DPE) and lysophosphatidylcholine (LPC) is 2-20% by weight of the phosphatides.

7. Composition according to claim 1 wherein the overall degree of hydrolysis of the phosphatides is such that the phosphatides comprise 5-40% of lysophosphatides (LPE+LPC) by weight of the phosphatides.

8. Composition according to claim 1, wherein the composition comprises 40-90% phosphatides.

9. The composition of claim 1 wherein the total amount of lyosphosphatidylcholine (LPC) is 0-15%.

10. Process for preparing a surface-active composition according to claim 1 by fractionating a composition comprising phosphatides to yield a fraction enriched in phosphatidylcholine and a fraction enriched in phosphatidylethanolamine, hydrolysing the fraction enriched in phosphatidylethanolamine and combining the phosphatidylcholine-enriched fraction with the hydrolysed phosphatidylethanolamine-enriched fraction.

11. Process according to claim 10 wherein the step of fractionating is carried out by extracting with a solvent the composition comprising the phosphatides.

12. Process according to claim 11, wherein the solvent comprises alkanol having 1-3 carbon atoms.

13. Process according to claim 10, wherein the fraction enriched in phosphatidylethanolamine is hydrolysed until the degree of hydrolysis of phosphatidylethanolamine is at least 0.4.

14. Process according to claim 13, wherein the degree of hydrolysis of phosphatidylethanolamine is at least 0.6.

15. Edible composition comprising a fat phase, from 0-90% by weight of an aqueous phase and 0.01-2 wt. % of the surface-active composition of claim 1.

16. Composition according to claim 15 comprising 0.05-0.5 wt. % phosphatides.

17. Composition according to claim 15 comprising 10-100 wt. % fat phase.

18. Composition according to claim 17 comprising 60-100 wt. % fat phase, said fat phase being a continuous fat phase.

19. Composition according to claim 18 comprising 75-90 wt. % continuous fat phase and 10-25 wt. % aqueous phase dispensed in said fat phase.

* * * * *

UNITED STATES PATENT AND TRADEMARK OFFICE
CERTIFICATE OF CORRECTION

PATENT NO. : 5,079,028

DATED : January 7, 1992

INVENTOR(S) : Theophil Wieske, Klaus H. Todt, Jan A. De Feyter, Wilhelmus A. Castenmiller It is certified that error appears in the above-identified patent and that said Letters Patent is hereby corrected as shown below:

IN THE CLAIMS

In claim 1, column 9, line 6, "phatidylethanolamine-enriched" should read --phatidylcholine-enriched--.

Signed and Sealed this

Twentieth Day of April, 1993

*Attest:*

MICHAEL K. KIRK

*Attesting Officer*　　　Acting Commissioner of Patents and Trademarks